Patented May 21, 1935

2,002,168

UNITED STATES PATENT OFFICE 2,002,168

STABILIZING CARBON TETRACHLORIDE

Paul S. Brallier, Niagara Falls, N. Y., assignor to Niagara Smelting Corporation, Niagara Falls, N. Y., a corporation of New York No Drawing. Application April 5, 1933, Serial No. 664,671

2 Claims. (Cl. 23—239)

The present invention relates to carbon tetrachloride, a corrosion inhibiting agent for it, and a method of inhibiting the corrosive action of carbon tetrachloride on metals.

In many processes it is necessary to use carbon tetrachloride in metal containers. As an example the dry cleaning art is referred to in illustration of the use of the invention, because it has great and particular merit in that field. Apparatus for dry cleaning with carbon tetrachloride, under present economic conditions, provides for recovery of used cleaning agent by distillation. It has been found that the common metals used for apparatus, such as steel, copper, brass and lead, are subject to corrosion by carbon tetrachloride as it is used for example in dry cleaning. Apparatus for distillation and recovery, and for storage of distilled material is likewise subject to corrosion, and at a much faster rate because of the increased temperature.

The present invention is based upon discovery of the causes of corrosion, and the introduction of suitable agent or agents to inhibit the corrosion.

One object of the invention is the addition of an inhibiting agent or mixture of such agents to carbon tetrachloride to minimize its corrosive action in certain uses thereof in contact with a given metal.

Another object is the use of a volatile inhibiting agent so that the same is distillable in recovery of the inhibited mixture.

A further object is the use of a volatile inhibitor which is capable of distilling over with the carbon tetrachloride in the normal procedure of distilling the latter, so that special attention to distillation is not required for assuring distillation of the inhibiting substance.

A particular object of the invention is the use of an ester of an alcohol and an organic acid or a mixture of them as inhibiting substance for the corrosion of copper.

In the following description of the invention reference is made by way of example to conditions encountered in the dry cleaning field but it is to be understood that the invention is not limited in application to such field, and that it is useful in extraction processes for fats, oils, waxes and the like. Detailed examples are given, citing specific metal, and specific inhibitors, but it is to be understood that the invention is not to be considered as limited to the specific disclosures. Such other uses of the invention, and variations thereof, are contemplated as fall within the scope of the accompanying claims.

The invention is based upon the discovery that corrosion of metal by carbon tetrachloride occurs when water is present, and most predominantly when the water is present in sufficient quantity to exist in a liquid phase apart from the liquid phase of carbon tetrachloride. By careful study I have discovered that pure water and pure carbon tetrachloride placed in contact with metal have together a corrosive effect which is at first a minimum. It has been ascertained particularly with copper that the corrosive effect is accelerated as corrosion occurs. It has therefore a self-catalyzing effect. For example when equal layers of water and carbon tetrachloride are refluxed at the boiling point of the carbon tetrachloride, and copper is in contact with the two liquid phases and the vapor phase, the corrosion has been found, under the particular conditions to be at the following average rates per 24 hours:

| | Milligrams per sq. decimeter |
|---|---|
| Vapor phase | 60 |
| Carbon tetrachloride phase | 47 |
| Water phase | 14,500 |

The rate of corrosion has been clearly observed to increase as copper chloride is formed in the liquid phase.

The initial cause of corrosion is suggested to be the formation of hydrochloric acid by a very limited degree of hydrolysis of the carbon tetrachloride by the action of water. There is a tendency to hydrolysis and this may be likened to a strained condition. It is believed that the metal surface relieves this strain, and accordingly, it may be considered as a catalyst for the hydrolysis. This is believed to be the correct explanation because the metals which are subject easily to corrosion by hydrochloric acid are the metals which are corroded by water and carbon tetrachloride. The acid is collected by the water as it is formed. It then is highly active on the metal, forming in the case of copper, copper chloride in solution. This appears to have a catalytic effect to hasten hydrolysis and form more acid, and hence more corrosion and hence more catalyzer. It is of course not known precisely to what extent the bare metal, or any oxide or sulphide film thereon, may initially act as a catalyzer, but the possibility is not at all remote.

In many arts, particularly dry cleaning, water is unavoidably present in carbon tetrachloride. It may be acquired by immersing air-dried fabrics therein, which contain perhaps 10% of moisture.

This may be replaced by carbon tetrachloride, forcing water from the fabric into the carbon tetrachloride. I am not concerned particularly with any special catalyzer, particularly in dry cleaning, because it is unavoidable that impurities are introduced, such as phosphorus from matches which may be in pockets, rust and all kinds of dirt, and many of these may be catalyzers.

In experimenting with copper, as a suitable metal for dry cleaning apparatus I have found that esters may be added in varying amounts singly or in admixture to carbon tetrachloride, so that in the presence of water the corrosive action is greatly reduced. I have used formates, acetates, propionates, benzoates, crotonates and salicylates of methyl, ethyl and propyl alcohols with advantage. Varying percentages from large to small are effective to give an inhibiting action.

In order to illustrate the improvement, or the inhibiting action, I have made comparative tests under fixed conditions which give relative measures of the efficiency. By using equal layers of water and carbon tetrachloride containing a measured percentage by volume of inhibitor (based on the volume of the carbon tetrachloride employed), and refluxing at the normal boiling point of carbon tetrachloride for at least 24 hours (in contact with metal at the water layer) the extent of corrosion may be determined. Tests have been made of refluxing for seven days. For convenience, the milligrams of metal dissolved per sq. dm. per unit of 24 hours, while in test, are referred to as the "corrosion figure". With no inhibitor it may be found to be 3766 milligrams per square decimeter per 24 hours while in test. It will be noted that this figure varies from one given above, but this merely indicates that the factors were different, and that the results are merely relative and not absolute. If these figures are properly weighted in accordance with the areas of metal exposed to the 3 phases, a consistency can be shown. It is also apparent that the area of metal exposed has some relation to the volume of liquid present. However, when 5% of methyl propionate is added, the corrosion figure is reduced from 3766 to from 1200 to 1500. When 5% of n-propyl formate is used, the corrosion figure has been found to be 1200 to 1500. When 5% of ethyl acetate is used, the corrosion figure has been high, at 3509. But when 36% of ethyl acetate is used, the corrosion figure is 234. The tests are in part comparative, but not precise measurements, it being understood that the rate of corrosion is accelerated by the products of corrosion. In commercial recovery operations this accelerating residue is constantly removed.

The quantity of methyl propionate has been reduced to as low as .43% obtaining inhibition represented by a corrosion figure of 2017. At the same concentration (.43%) of n-propyl formate, the corrosion figure is 1200. This indicates that in low quantities the n-propyl formate is more effective than methyl propionate.

In selecting an inhibitor I prefer a volatile one, but this is of course not essential in the broadest aspects of the invention. In selecting a volatile one I prefer one which volatilizes with the carbon tetrachloride in distillation for recovery of an inhibited mixture. Inhibitors which boil from 10° C. or 18° F. on either side of the boiling point of carbon tetrachloride (77° C.) are suitable. Ethyl acetate has approximately the same boiling point as carbon tetrachloride.

I have used the materials effectively in concentrations as low as .2% by volume and up to and above 5% by volume, and find that the lower quantities are as effective and sometimes apparently more effective than a larger quantity, such as 5%. The following table gives materials, the lowest quantity tested, and a corrosion figure therefor.

| Material | Percent by volume | Corrosion figure |
| --- | --- | --- |
| No inhibitor | | 3766 |
| Normal propyl formate | 0.14 | 1505 |
| Ethyl acetate | 0.26 | 2066 |
| Methyl propionate | 0.21 | 1622 |
| Ethyl crotonate | 0.21 | 1655 |
| Ethyl benzoate | 0.28 | 1974 |
| Methyl salicylate | 0.56 | 3260 |

The character of results from numerous studies is suggestive of the possibility that the inhibitor acts as a film at the metal surface, possibly being selectively adsorbed by it from the body of the liquid. The fact that small quantities are as effective as larger quantities supports this theory. Such an adsorbed film would insulate the carbon tetrachloride from the metal and minimize catalytic effects of the metal. Such a theory indicates that the effects will be dependent both on the metal and the inhibitor, and that the inhibitor must be chosen with respect for the metal exposed. This is in accordance with experimental findings that an inhibitor which is suitable for one metal is not suitable for all metals. The film theory would account for lack of great improvement in increasing the quantity of inhibitor, which is likewise consistent with experimental findings. It is not however intended to limit the invention to or by this theory of its functioning.

It is to be understood that no upper limit of concentration is herein defined. Very much larger quantities have been used, for example, 36% by volume of ethyl acetate for copper, with a corrosion figure of 234. Because the inhibitors are ordinarily more expensive than the carbon tetrachloride base, it is highly advantageous that very small quantities are practically effective. In like manner no lower limit is defined. According to the projected theory of the action, very much smaller quantities than .2% would suffice, but a sufficient excess is deemed desirable to insure against accidental reduction of the concentration to a point below some critical point, which would vary with conditions, if the film theory is correct.

For all practical purposes it may be considered that 5% is a safe commercial upper limit for an inhibited mixture which is intended for use in dry cleaning with subsequent recovery operations. For the simple purpose of exerting an inhibiting function, a small but appreciable quantity under 1% is considered sufficient. Hence, for practical purposes, some of the claims define the invention within these limits, without, however, limiting the scope as defined by other claims.

I have also observed that an inhibitor which is specific for one metal may be an accelerator for corrosion of other metal. It is therefore a matter of experiment with specific metals and specific materials to determine which combinations have the desired advantage. I cannot of course run through tests with all the available metals and all the available materials which might be inhibitors. Therefore I consider that the invention herein is the act of adding a proper soluble inhibiting agent to carbon tetrachloride, in adding one which is volatile, and in adding one which is volatile with the carbon tetrachloride in distillation thereof.

I claim:

1. The method of protecting copper from the corrosive action of carbon tetrachloride in the presence of water which comprises adding to the carbon tetrachloride ethyl acetate.

2. Carbon tetrachloride containing ethyl acetate.

PAUL S. BRALLIER.